Patented Sept. 6, 1927.

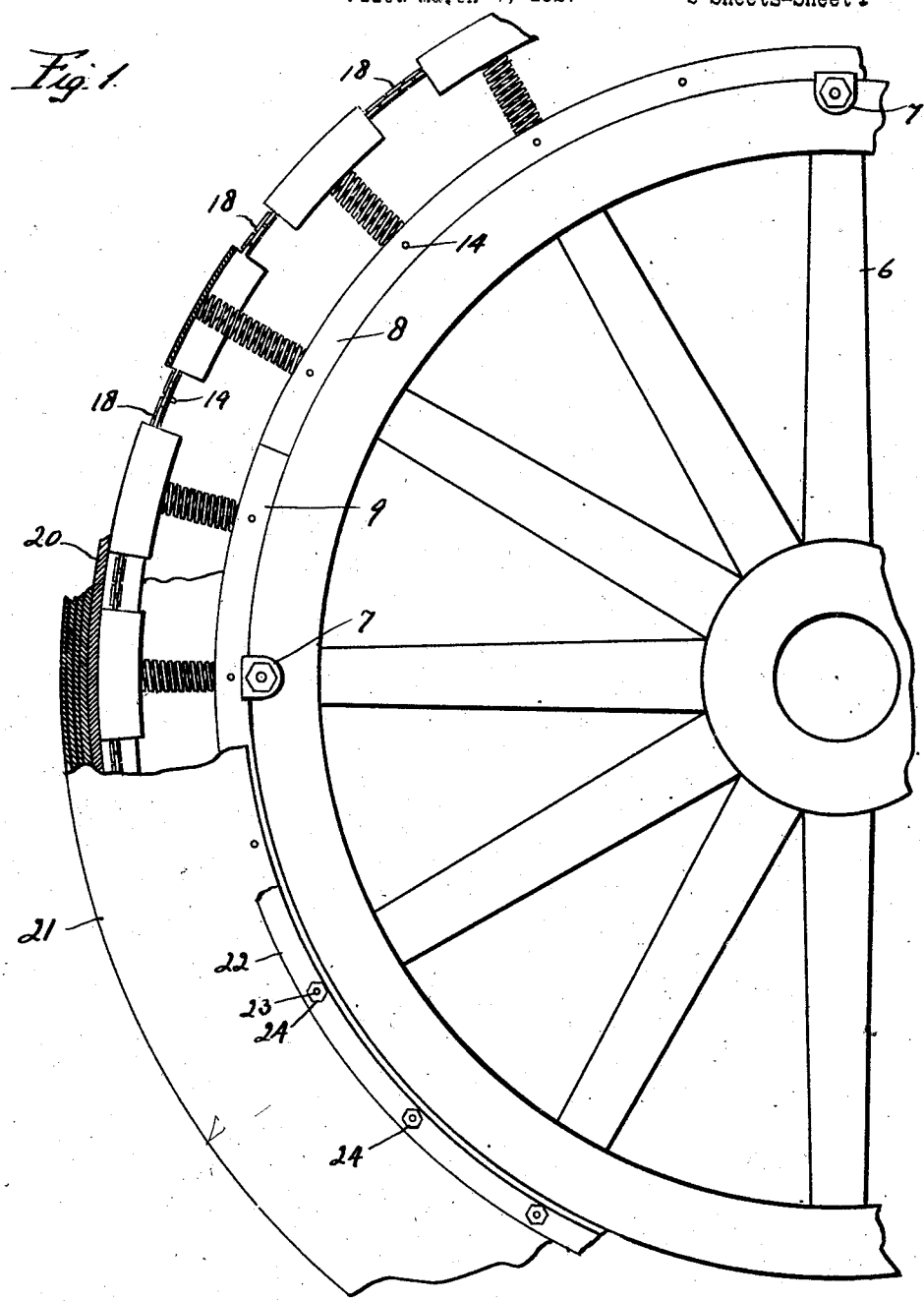

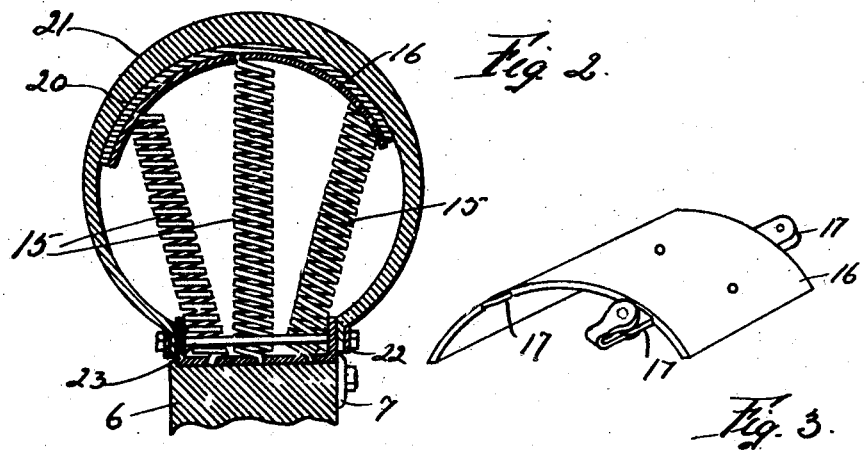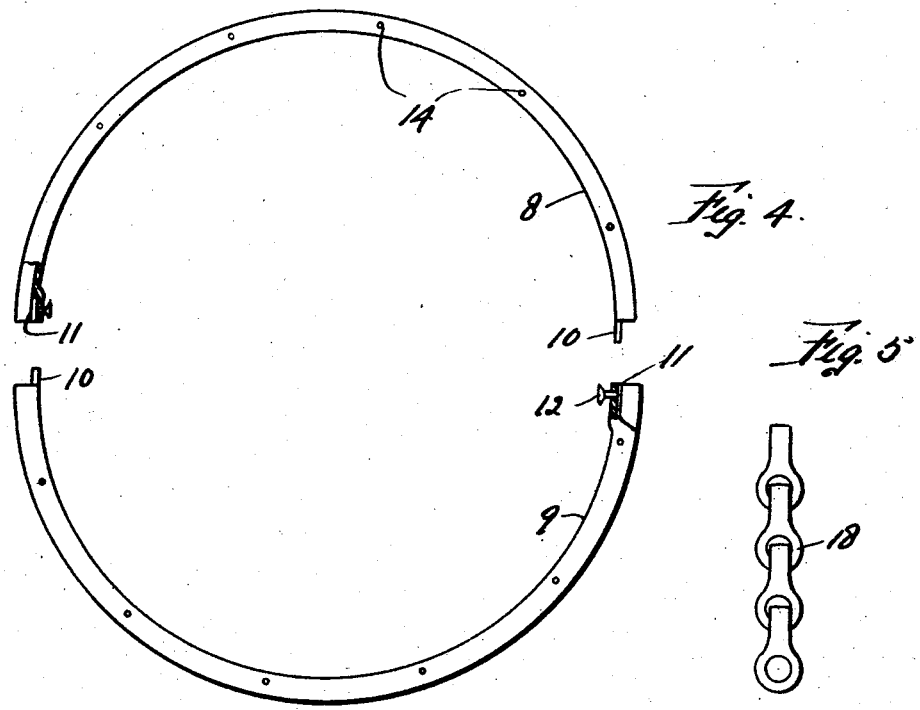

1,641,909

UNITED STATES PATENT OFFICE.

WILLIAM D. THOMAS, OF PHILADELPHIA, PENNSYLVANIA.

RESILIENT AUTOMOBILE WHEEL.

Application filed March 7, 1927. Serial No. 173,341.

My invention relates to new and useful improvements in a resilient automobile wheel, and has for its primary object the use of springs in unique arrangement as a substitute for the ordinary pneumatic tired wheels, which will give substantially the same resiliency without the attendant disadvantages.

Another object of the invention is to provide a resilient wheel including a pair of coacting semi-circular flanged sections or channel irons having sets of springs attached thereto, each set consisting of three springs arranged in a row radially of a channel iron and having their outer ends secured to a plate surmounted by a felt pad, and all enclosed in a rubber tire ordinarily termed a shoe.

A further object of my invention is to provide for flexibly connecting the several plates attached to the springs.

A still further object of my invention is to so construct the parts that when assembled the resultant unit may be demountably placed and fastened on a wheel.

With these and other ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:

Fig. 1, is a fragmentary side elevation of a wheel constructed in accordance with my invention, having a portion of the tire and a part of one of the plates broken away, and shown in section to illustrate details of construction.

Fig. 2, is an enlarged transverse section of the device.

Fig. 3, is an enlarged perspective view of one of the plates.

Fig. 4, is a side elevation, on a reduced scale, of the sectional channel ring with parts broken away to show structional details.

Fig. 5, is an enlarged face view of one of the sections of chain.

In carrying out my invention as herein embodied, 6 represents the ordinary or usual automobile wheel conventionally illustrated on which is removably mounted the resilient unit by means of the lugs 7.

The resilient unit includes a sectional channel ring consisting of two coacting semicircular flanged members or sections 8, 9, each having at one end a tongue 10, and at the other end a socket 11 for reception of the tongue of the companion section so that their meeting ends inter-engage and may be held together by suitable fastening means 12, such as screws having tapered heads for countersinking in the ring sections. The flanges of the channel ring sections have holes 14 for a purpose to be later described.

To each ring section are secured the inner ends of a plurality of springs 15 arranged in sets of three springs positioned radially of the ring sections with their outer ends diverging in fan-like manner, as plainly shown in Fig. 2. The outer ends of each set of springs are fastened to an arcuate plate 16 having a pair of projections 17 at each end thereof. The several plates 16 have flat chains 18 or equivalent flexible means connected to their projections so that any force exerted on one set of springs will be distributed over a number of sets. The chains adjacent the meeting ends of the ring sections are provided with hooks 19 to permit separation of the parts on one ring section from those on the other ring section.

The plates 16 are surmounted by a felt pad 20 to prevent undue wear or damage to the interior of the tire or shoe 21 which encloses the springs, plates and other component parts with the edges of said tire overlapping the flanges of the channel ring sections.

Integral flat rings 22 are superimposed on the edges of the tire, and said rings and tire are fastened in place on the channel ring by the bolts 23 passing through the holes 14 in the channel ring, the tire and flat rings 22 with nuts 24 threaded thereon.

To assemble the device, first one and then the other member of the sectional channel ring with its associated parts is placed in the tire, and the ends of said members sprung into position and fastened by the screws 12. Next the rings 22 are placed on the outside of the tire edges, and the bolts 23 passed through the rings 22, the tire edges and the flanges of the sectional ring to complete the assembly of the unit. After this has been done, the unit may be placed upon the wheel proper and fastened by the lugs 7.

From the foregoing description it will be obvious that a wheel of this character will absorb the shocks incident to striking obstructions on a roadway, and will not be punctured and caused to collapse as is the case with pneumatic tires, thus eliminating many of the annoyances found in the air filled tires.

Of course I do not wish to be limited to the exact details of construction as herein shown as these may be varied within the limits of the appended claims without departing from the spirit of my invention.

Having thus fully described my invention, what I claim as new and useful is:

1. In a resilient automobile wheel, a sectional channel ring, springs arranged in sets with their inner ends attached to the channel ring sections, each set including a number of springs positioned radially of the channel ring, arcuate plates secured to the outer ends of the sets of springs, flexible means connecting the adjacent ends of adjacent plates, a tire enclosing the springs and plates with its edges overlapping the channel ring, and means to secure the edges of the tire to said channel ring.

2. In a device of the character stated, a sectional channel ring, means to hold the sections together, a tire having its edges secured to the flanges of the channel ring, plates within the tire and springs arranged in sets of three radially of the channel ring between said ring and the plates.

3. The combination with a wheel of a sectional channel ring, a tongue formed at one end of each section, a socket formed at the other end of each section, the socket and tongue of one section coacting with similar parts of the other section, screws passing through the socket and threaded into the tongues to hold the ring sections together, a tire into which the sectional ring is projected, rings superimposed on the outer surfaces of the edges of the tire, means passing through the last mentioned rings, the edges of the tire and the flanges of the sectional ring to hold the parts together, arcuate plates, springs located between the sectional ring and the plates and having their ends secured to said ring and plates, said springs being arranged in sets of three, each set with their outer ends diverging in a fan-like manner, lugs at each end of said plate, flat chains connected with the lugs at adjacent ends of adjacent plates, and a felt pad positioned between the plates and the inner surface of the tire.

In testimony whereof, I have hereunto affixed my signature.

WILLIAM D. THOMAS.